United States Patent
Grumbach et al.

(10) Patent No.: US 12,195,401 B2
(45) Date of Patent: Jan. 14, 2025

(54) PRE-IMPREGNATED ROVINGS FOR COMPOSITE MATERIAL

(71) Applicants: SAFRAN CERAMICS, Le Haillan (FR); IRT ANTOINE DE SAINT EXUPERY, Toulouse (FR); CENTRE NATIONAL DE LA RECHERCHE SCIENTIFIQUE, Paris (FR); UNIVERSITE PAUL SABATIER TOULOUSE III, Toulouse (FR)

(72) Inventors: Fanny Grumbach, Aix-en-Provence (FR); Gautier Mecuson, Moissy-Cramayel (FR); Aude Paillassa, Bordeaux (FR); Florence Ansart, Labege (FR); Sandrine Duluard, Toulouse (FR); Nicolas Laval, Moissy-Cramayel (FR)

(73) Assignees: SAFRAN CERAMICS, Le Haillan (FR); IRT ANTOINE DE SAINT EXUPERY, Toulouse (FR); CENTRE NATIONAL DE LA RECHERCHE SCIENTIFIQUE, Paris (FR); UNIVERSITE PAUL SABATIER TOULOUSE III, Toulouse (FR)

( * ) Notice: Subject to any disclaimer, the term of this patent is extended or adjusted under 35 U.S.C. 154(b) by 14 days.

(21) Appl. No.: 18/249,670

(22) PCT Filed: Oct. 19, 2021

(86) PCT No.: PCT/FR2021/051822
§ 371 (c)(1),
(2) Date: Apr. 19, 2023

(87) PCT Pub. No.: WO2022/084621
PCT Pub. Date: Apr. 28, 2022

(65) Prior Publication Data
US 2023/0391678 A1 Dec. 7, 2023

(30) Foreign Application Priority Data

Oct. 21, 2020 (FR) .................................... 2010787

(51) Int. Cl.
*C04B 35/628* (2006.01)
*C04B 35/117* (2006.01)
(Continued)

(52) U.S. Cl.
CPC ...... *C04B 35/62886* (2013.01); *C04B 35/117* (2013.01); *C04B 35/14* (2013.01);
(Continued)

(58) Field of Classification Search
CPC ........................ C04B 35/62886; C04B 35/117
See application file for complete search history.

(56) References Cited

U.S. PATENT DOCUMENTS

| | | | |
|---|---|---|---|
| 2003/0017950 A1* | 1/2003 | Rey | C04B 35/80 505/470 |
| 2004/0132607 A1 | 7/2004 | Wood et al. | |

(Continued)

FOREIGN PATENT DOCUMENTS

| | | |
|---|---|---|
| CN | 1735574 A | 2/2006 |
| CN | 101591148 A | 12/2009 |

(Continued)

OTHER PUBLICATIONS

International Search Report as issued in International Patent Application No. PCT/FR021/051822, dated Feb. 3, 2022.
(Continued)

*Primary Examiner* — Nathan T Leong
(74) *Attorney, Agent, or Firm* — Pillsbury Winthrop Shaw Pittman LLP

(57) ABSTRACT

A method for impregnating an oxide fibre roving with a matrix of alumina and silica includes a introducing an oxide
(Continued)

fibre roving into an impregnation bath, wherein the impregnation bath is prepared by sol-gel process and includes a silica precursor in the form of a hybrid polymeric sol, an alumina precursor in the form of a colloidal sol and ceramic particles.

6 Claims, 1 Drawing Sheet

(51) Int. Cl.
    *C04B 35/14*      (2006.01)
    *C04B 35/18*      (2006.01)
    *C04B 35/634*      (2006.01)
    *C04B 35/80*      (2006.01)

(52) U.S. Cl.
    CPC ........ *C04B 35/18* (2013.01); *C04B 35/62849* (2013.01); *C04B 35/62852* (2013.01); *C04B 35/63416* (2013.01); *C04B 35/63444* (2013.01); *C04B 35/63488* (2013.01); *C04B 35/80* (2013.01); *C04B 2235/3218* (2013.01); *C04B 2235/441* (2013.01); *C04B 2235/483* (2013.01); *C04B 2235/5224* (2013.01); *C04B 2235/5445* (2013.01)

(56) References Cited

U.S. PATENT DOCUMENTS

| | | |
|---|---|---|
| 2011/0259506 A1 | 10/2011 | Butler |
| 2020/0338840 A1 | 10/2020 | Schwartz et al. |

FOREIGN PATENT DOCUMENTS

| | | | |
|---|---|---|---|
| CN | 110526728 A | | 12/2019 |
| CN | 110951210 A | | 4/2020 |
| CN | 111247116 A | | 6/2020 |
| DE | 10 2015 219442 A1 | | 4/2017 |
| FR | 3 074 172 A1 | | 5/2019 |
| WO | WO 03/010781 A2 | | 2/2003 |
| WO | WO 2019/081846 A1 | | 5/2019 |
| WO | WO 2019/105966 A1 | | 6/2019 |
| WO | WO2019105966 | * | 6/2019 |
| WO | WO 2019/142168 A1 | | 7/2019 |
| WO | WO2019142168 | * | 7/2019 |

OTHER PUBLICATIONS

First Office Action and Search Report as issued in Chinese Patent Application No. 202180071767.1, dated Feb. 2, 2024.

* cited by examiner

[Fig. 1]
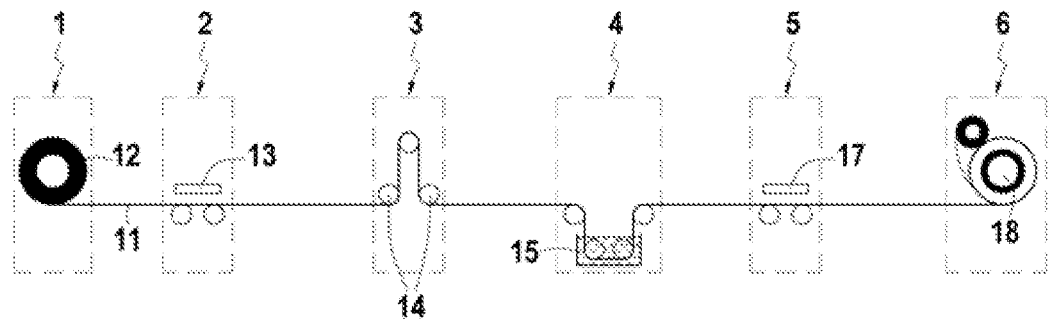
[Fig. 2]
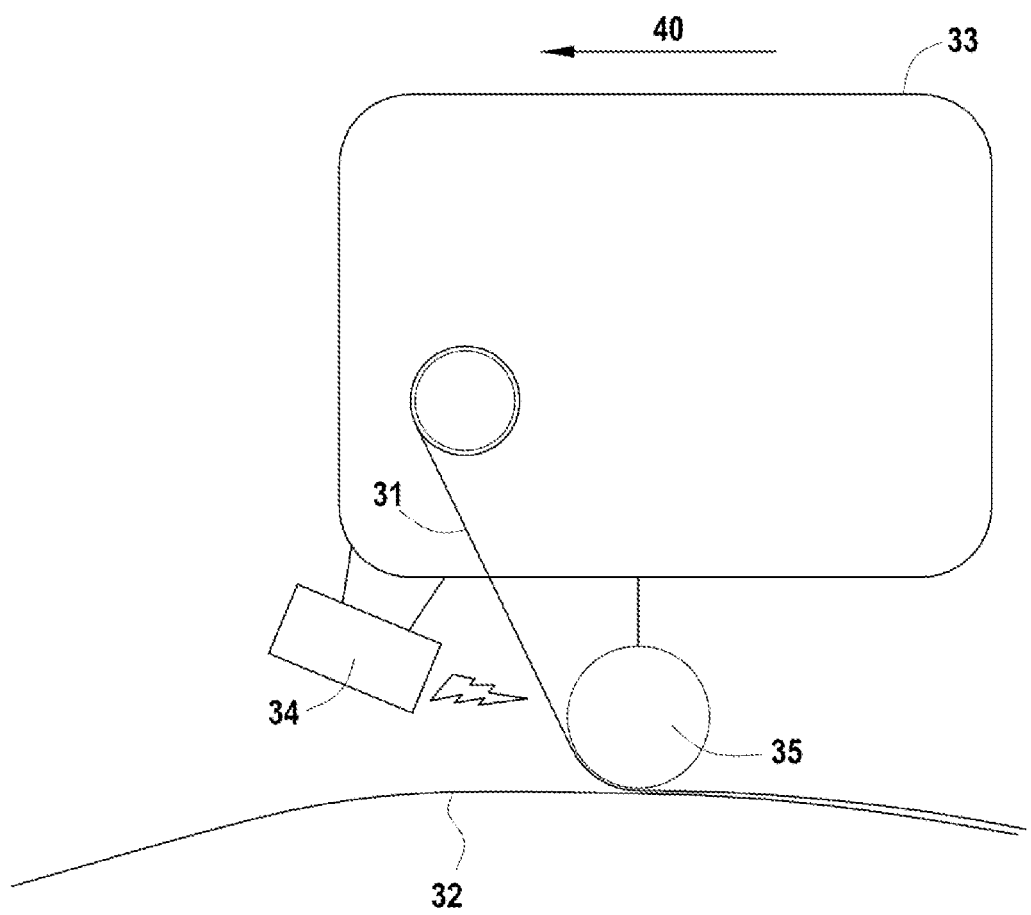

PRE-IMPREGNATED ROVINGS FOR COMPOSITE MATERIAL

CROSS-REFERENCE TO RELATED APPLICATIONS

This application is the U.S. National Stage of PCT/FR2021/051822, filed Oct. 19, 2021, which in turn claims priority to French patent application number 2010787 filed Oct. 21, 2020. The content of these applications are incorporated herein by reference in their entireties.

TECHNICAL FIELD

The invention relates to the production of ceramic matrix composite materials, in particular oxide/oxide composite materials, and more precisely to the preparation of pre-impregnated fibre preforms for the production of these materials.

PRIOR ART

Parts made of ceramic matrix composite materials are of industrial interest in certain technical fields, especially because of their high mechanical properties and their ability to maintain these properties at temperature.

The composite material parts can be manufactured by the succession of a step of preparing a fibre preform with dimensions close to the desired part, then a step of impregnating the preform with a ceramic matrix in order to obtain the final part.

In cases where the geometry of the desired part is complex, the preparation of the fibre preform can be greatly simplified by using for its preparation a method of automatic placement of the fibres, the fibres then being impregnated with a matrix, for example, through a resin transfer moulding method.

To facilitate the step of impregnating the preform with a matrix, it is also known from the prior art to use pre-impregnated rovings. With such rovings, once the preform has been prepared, the impregnation step can be omitted, because the resin is already contained in the rovings forming the preform, and heating the rovings then makes it possible to form the matrix and obtain the final part of composite material.

Unfortunately, the available pre-impregnated rovings are not compatible with automatic fibre placement methods.

DISCLOSURE OF THE INVENTION

The invention aims precisely at making it possible to retain the advantages of the two abovementioned methods.

To this end, it concerns, according to a first of its aspects, a method of impregnating a roving of oxide fibres with a matrix of alumina and silica comprising a step of introducing a roving of oxide fibres into an impregnation bath, characterized in that the impregnation bath is prepared by sol-gel process and comprises a silica precursor in the form of a hybrid polymeric sol, an alumina precursor in the form of a colloidal sol and ceramic particles.

The advantage of the sol-gel impregnation method resides in the fact that this formulation of the impregnation bath allows the integration of active inorganic binders, especially hybrid polymeric sol and colloidal sol, which contribute to a better consolidation of the matrix through the creation of covalent bonds between the ceramic particles during the heat treatment of the final part, helping to strengthen the cohesion of the matrix.

This impregnation method makes it possible to have a pre-impregnated roving that is compatible with an automatic fibre placement method.

Within the meaning of the invention, the term 'roving' should be understood as an assembly of fibres or filaments substantially parallel to one another and joined without weaving. For example, a roving may contain more than ten thousand fibres.

In particular, the use of an impregnation bath in the sol-gel form in which an oxide roving is dipped makes it possible to impregnate the rovings with a matrix of optimized composition so that the roving has the desired characteristics, especially in terms of flexibility and tackiness.

It has especially been observed that the use of a sol-gel impregnation bath makes it possible to obtain good flexibility of the rovings, provided especially by the organic part of the sol-gel bath, so that they can be used with a robot for automatic fibre placement. In addition to this flexibility, it is also observed that the rovings thus obtained nevertheless have sufficient stiffness to allow correct placement, without causing folds.

Finally, the tackiness of the rovings can be reactivated upon deposition by heating or wetting. This allows easy storage of the rovings, especially in the form of a roll, because their tack is not too great but can be reactivated simply to allow an easier disposition during deposition by automatic placement of fibres.

The choice of this particular impregnation bath results in numerous advantages.

Unlike the rovings of the prior art, the particular choice of the impregnation bath and its components makes it possible to fill rovings to the core. It is understood by the expression of a 'core' filling that the mineral fillers and the hybrid polymeric sol comprised in the impregnation bath are uniformly impregnated throughout the entire volume of the roving.

The core filling of the rovings makes it possible to increase the load contained in the so rovings, compared to rovings of the prior art. Thus, the rovings make it possible to obtain final materials via automatic fibre placement techniques inaccessible with the pre-impregnated rovings of the prior art.

Core filling is made possible by the rheological behavior of the impregnation bath, itself dependent on its composition. It is especially the particular choice of a hybrid polymeric sol that allows the bath to have an appropriate behavior for the impregnation of the rovings.

In addition, the core filling of the rovings makes it possible to ensure the calibration of the shape of the rovings and to maintain this calibration over time, especially during deposition by automatic placement of the fibres. This makes it possible, with these rovings, to produce preforms that are more homogeneous than with rovings of the prior art which are only partially filled. This control of the calibration of the rovings makes it possible to obtain a more precise deposition step. In fact, the core-filled rovings deform less during deposition by automatic placement compared to partially filled rovings. The pre-impregnated preforms obtained are therefore less subject to unexpected variations in their dimensions. This results in fibre preforms obtained in a more reproducible manner and closer to the desired final dimensions.

The term 'hybrid polymeric sol' is understood to mean that the polymeric sol comprises organic parts and inorganic parts. Such hybrid polymeric sols may be, for example, polysiloxanes.

The particular components chosen for the impregnation bath ensure, in combination, that the impregnated rovings fulfil all the expected properties.

On the one hand, the ceramic filler provides most of the matrix supply that the pre-impregnated rovings must have in order to obtain a composite material. Without this ceramic filler, the quantity of matrix contained in the rovings would not be sufficient.

On the other hand, the choice of a hybrid polymeric sol as a silica precursor, in addition to ceramic particles, allows the pre-impregnated rovings to contain even more matrix, provided by the inorganic part of the sol. In addition, this part of the matrix is located as far as the core of the rovings, whereas it is observed that in the absence of this polymeric sol, the rovings are filled only superficially.

The organic part of the sol is eliminated during the curing of the matrix. And it therefore makes it possible to provide a desired porosity evenly distributed throughout the entire final part.

The precise definition of the impregnation bath makes it possible to obtain a final composite material having a precisely chosen composition, especially in terms of porosity, fibre content and matrix quantity.

In one embodiment, the method is a method of impregnating a roving of oxide fibres with a matrix of alumina and silica comprising a step of introducing a roving of oxide fibres into an impregnation bath, characterized in that the impregnation bath is prepared by sol-gel process and comprises a silica precursor in the form of a hybrid polymeric sol, an alumina precursor in the form of a colloidal sol and ceramic particles and in that the rovings are filled to the core.

Within the meaning of the invention, it is understood that the 'alumina and silica matrix' is in reality the composition impregnating the pre-impregnated rovings obtained by the method of the invention, and is therefore not identical to the matrix of a part made of composite material.

In one embodiment, the oxide fibre rovings are aluminum oxide fibre rovings.

In one embodiment, the silica precursor may be chosen from polysiloxane polymers, and more precisely chosen from (3-glycidyloxypropyl)triethoxysilane (GPTES), (3-glycidyloxypropyl)trimethoxysilane (GPTMS), (3-glycidyloxypropyl)diethoxysilane (GPDES) or ureidopropyltrimethoxysilane (UPS).

In one embodiment, the alumina precursor may be colloidal boehmite or aluminum isopropoxide (AIP).

In one embodiment, the weight ratio between the silica precursor and the alumina precursor in the impregnation bath may be between 90/10 and 50/50.

The choice of these polymers gives the rovings the desired flexibility and tackiness characteristics, particularly compatible with automatic placement methods.

For example, colloid boehmite can be composed of particles whose size distribution is centered around a value between 0.1 and 0.5 μm.

In one embodiment, the impregnation bath may comprise, in addition to the silica precursor and the alumina precursor, one or more organic polymers.

In this embodiment, the total organic polymer content may be between 10% and 35% of the total mass of the elements introduced into the impregnation bath.

Such organic polymers may be chosen from water-soluble thermoplastics or tackifier resins such as polyvinylpyrrolidone, polyethylene glycol, polyvinyl alcohol or poly(2-ethyl-2-oxazoline).

These polymers can make it possible to optimize the tackiness of the rovings after impregnation. In addition, they also make it possible to increase the flexibility of impregnated rovings, and thus facilitate rolling them for storage. Finally, their degradation during the preparation of a composite material part makes it possible to create porosities, and the choice of incorporating these porosities in the rovings thus makes it possible, to a certain extent, to dimension the final properties of a composite material part obtained from these rovings.

In one embodiment, the ceramic particles included in the integration bath may be alumina powder. Such a powder makes it possible to increase the filling of the alumina matrix into the rovings during the impregnation step.

In such an embodiment, the impregnation bath may also comprise a dispersant, in order to prevent the sedimentation of ceramic particles, and thus to ensure that the properties of the impregnation bath are preserved throughout the duration of the impregnation.

The dispersant may be a polymer, for example chosen from polymethacrylates.

According to another of its aspects, the invention also relates to a method of manufacturing a part made of composite material having an alumina and silica matrix, comprising a step of automatically placing pre-impregnated oxide fibres as described above and a step of sintering the pre-impregnated oxide fibres.

Such a method makes it possible to obtain parts with complex geometries without having to develop new tools for automatic fibre placement, the rovings described above being adapted to the already existing automatic placement methods.

In one embodiment, the composite material manufacturing method requires no steps other than the automatic fibre placement preform manufacturing step and the sintering step. The result is a greatly simplified method of manufacturing a composite material.

Indeed, the filling obtained for the pre-impregnated rovings ensures a sufficient quantity of matrix in the pre-impregnated rovings distributed homogeneously in the preform, so that it is not necessary to apply an additional step of preparing the preform, often observed with pre-impregnated rovings of the prior art to obtain a better distribution of the matrix in the preform.

It is to the credit of the inventors to have succeeded in defining a composition of an impregnation bath which allows, on the one hand, a sufficient matrix filling of the pre-impregnated rovings, obtained by means of core filling, and which allows, on the other hand, the rovings to have properties compatible with automatic fibre placement. According to another of its aspects, the invention relates to a roll comprising at least one pre-impregnated roving of oxide fibres obtained by means of the impregnation method described above.

Such a roll allows easy storage of rovings as described above, and also allows the rovings to be transported.

Indeed, the particular choice of the components of the impregnation bath and especially of the hybrid polymeric sol ensures that the rovings are sufficiently flexible to be able to be stored in the form of a roll, but also sufficiently rigid to remain compatible with an automatic fibre placement method even after storage.

BRIEF DESCRIPTION OF THE DRAWINGS

FIG. 1 is a schematic representation of a method of impregnating a roving according to an embodiment of the invention.

FIG. 2 is a schematic representation of a method for preparing a fibre preform according to an embodiment of the invention.

DESCRIPTION OF THE EMBODIMENTS

The invention is now described by means of particular embodiments which should not be interpreted in a limiting manner.

FIG. 1 shows a method for preparing a roll of pre-impregnated oxide fibre rovings.

As described above, it is the components of the impregnation bath 15 that will enable the pre-impregnated rovings 11 to be subsequently used in a method for preparing a fibre preform with an automatic fibre placement method.

In the method described in FIG. 1, the impregnation step 4 may be preceded by one or more steps making it possible to improve the impregnation of the roving 11 by the matrix of the impregnation bath 15.

Such optional and independent steps are illustrated schematically in FIG. 1. It should not be understood from FIG. 1 that all these steps must be present simultaneously, and they may each be present or not according to the impregnation needs.

For example, the method may comprise an unrolling step 1 then sizing removal step 2 before impregnation 4. During these steps, a previously sized oxide fibre roving 11 in the form of a roll 12 is unrolled and then the sizing is removed by means of a heat treatment, for example between 450 and 700° C., applied by means of a heating member 13.

Impregnation may also be preceded by a step 3 of spreading the fibres, during which a comb 14 spreads the oxide fibre rovings 11.

Such a spreading step 3 makes it possible to increase the contact surface between the impregnation bath 15 and the fibres of the rovings and thus allows better impregnation of the rovings 11 during contact with the impregnation bath 15.

The method can then comprise the step of impregnation by dipping 4 in the impregnation bath 15, having the characteristics described above.

The method may also comprise a drying step 5, carried out by means of a second heating member 17, then a rolling step 6, making it possible to roll the oxide fibre roving 11, which is now impregnated, around a roll 18.

As described above, it is the components of the impregnation bath 15 that make it possible to ensure that the pre-impregnated rovings obtained are compatible with the deposition conditions of an automatic fibre placement method.

FIG. 2 schematically illustrates a method for automatically placing the pre-impregnated fibres obtained according to one of the embodiments described above, allowing the manufacture of a part made of ceramic matrix composite material.

In such a manufacturing method, the pre-impregnated rovings 31 are deposited on the surface of a mould 32. The deposition tool 33 is equipped with a heating head 34 enabling the tackiness of the rovings to be activated, and the rovings 31 to adhere to the mould 32 or, where appropriate, to the rovings already placed. The arrow 40 represents the direction of movement of the tool 33.

The tooling is also provided with a compacting wheel 35 which makes it possible to apply pressure to the deposited rovings 31 and thus to enable the preform to be manufactured.

The preform thus obtained by the successive deposition of the rovings 31 is then sintered during a step (not shown) to arrive at a part made of ceramic matrix composite material.

This method combines the advantage of a pre-impregnated preform and the advantage of a fibre deposition method using an automatic fibre placement method. In fact, this method does not require a step of injection of the matrix, the latter being already contained in the deposited rovings. It also does not require the fibres to be placed by hand, since they are compatible with automatic placement.

Example

The invention is now illustrated by means of an example of embodiment which should not be interpreted restrictively.

An impregnation bath is prepared by introducing colloidal boehmite into a solution containing water and polyvinylpyrrolidone with a molecular weight of 3500 g/mol, to reach a concentration between 275 g/L and 1100 g/L. The colloidal boehmite is introduced in a concentration of 80 g/L, and has a particle size of around 0.2 µm. The solution is then peptised by introducing acetic acid in a concentration of mol/L.

The solution thus prepared is then stirred until the boehmite aggregates have completely disappeared. A dispersant is then added, for example ammonium polymethacrylate Alumina powder is then added, and the solution is stirred for a few hours.

After this stirring, a hybrid silica precursor, (3-glycidyloxypropyl)triethoxysilane, is introduced dropwise into the solution and the mixture is then stirred for 12 hours.

The weight ratio between the silica precursor and the alumina precursor is 75/25.

The impregnation bath is then ready, and it is possible to impregnate oxide rovings, for example by means of a method illustrated schematically in FIG. 1, described above.

Such rovings can then be used during a manufacturing method with automatic placement of the fibres, for example the one illustrated in FIG. 2, described above.

The invention claimed is:

1. A method for impregnating an oxide fibre roving with a matrix of alumina and silica comprising introducing an oxide fibre roving into an impregnation bath, wherein the impregnation bath is prepared by sol-gel process and comprises a silica precursor in the form of a hybrid polymeric sol, an alumina precursor in the form of a colloidal sol and ceramic particles.

2. The impregnation method according to claim 1, wherein the rovings are aluminum oxide fibres.

3. The impregnation method according to claim 1, wherein the silica precursor is chosen from (3-glycidyloxypropyl)triethoxysilane-(GPTES), (3-glycidyloxypropyl)trimethoxysilane (GPTMS), (3-glycidyloxypropyl)diethoxysilane (GPDES) or ureidopropyltrimethoxysilane (UPS).

4. The impregnation method according to claim 1, wherein the alumina precursor is colloidal boehmite or aluminium isopropoxide (AIP).

5. The impregnation method according to claim 1, wherein the ceramic particles are alumina powder.

6. The impregnation method according to claim 1, wherein the impregnation bath further comprises an organic polymer selected from water-soluble thermoplastics or tackifying resins.

* * * * *